United States Patent Office 2,806,042
Patented Sept. 10, 1957

2,806,042
17-ALKYLSULFONYL AND 17-ALKYLSULFINYL SUBSTITUTION PRODUCTS OF 5-ANDROSTEN-3-OL AND ESTERS THEREOF

Raymond M. Dodson, Park Ridge, and Paul B. Sollman, Skokie, Ill., assignors to G. D. Searle & Co., Chicago, Ill., a corporation of Illinois No Drawing. Application October 11, 1955, Serial No. 539,917

12 Claims. (Cl. 260—397.5)

The present invention relates to a new class of thiosteroids, and is specifically concerned with 17-alkylsulfonyl and 17-alkylsulfinyl substitution products of 5-androsten-3-ol and esters thereof. The compounds of the present invention can be represented by the structural formula

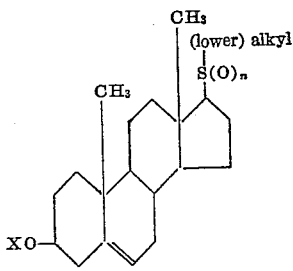

wherein X is a member of the group consisting of hydrogen and acyl radicals derived from lower alkanoic acids and $n$ is 1 or 2. The term lower alkyl as used herein includes methyl, ethyl, propyl, butyl, amyl, hexyl, heptyl, octyl, and branched-chain isomers thereof. When X is an acyl radical derived from a lower alkanoic acid, it can represent such acyl radicals as formyl, acetyl, propionyl, butyryl, valeryl, hexanoyl, heptanoyl, octanoyl, and branched-chain isomers thereof.

The foregoing general structural representation is not to be interpreted as expressing limitations with respect to the configurations of the valence bonds directed from, or the groups bonded to, the sulfur atom. Various conformations and configurations of and within the sulfur-containing substituent are comprehended within the scope of this invention. The sulfones of this invention include the 17α-alkylsulfonyl compounds having the structural formula

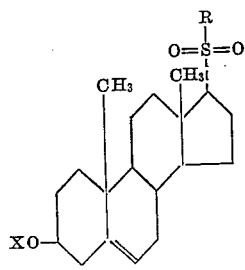

and the 17β-alkylsulfonyl compounds having the structural formula

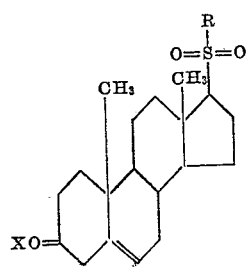

The sulfoxides of this invention include stereoisomeric 17α-alkylsulfinyl compounds having the formulas

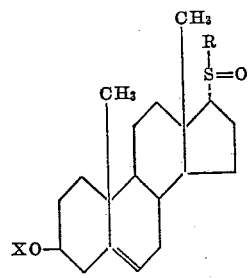

and

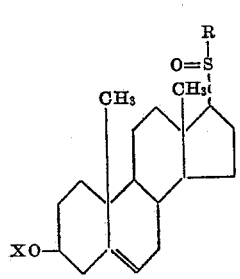

in which the opposite configurations of the sulfoxide oxygen are represented by arbitrary means, and stereoisomeric 17β-alkylsulfinyl compounds having the formulas

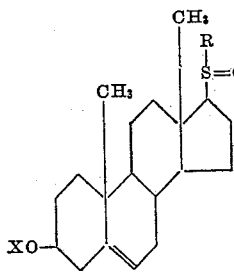

and

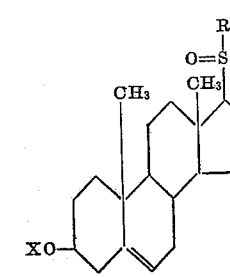

in which the opposite configurations of the sulfoxide oxygen are similarly represented by arbitrary means. The term R in the foregoing structural formulas represents a lower alkyl group and X is defined as hereinbefore.

It is further to be noted that for purposes of convenience, the sulfones and sulfoxides are represented herein by their classical covalent bond structures, whereas the modern view, less easily representable, is that these compounds are resonance hybrids of the covalent and semipolar double bond structures. It will be obvious that lack of agreement among those skilled in the art as to the precise nature of the valence bonds in sulfones and sulfoxides does not in any way limit the useful applications of the compounds of this invention.

Among the starting materials suitable for the manufacture of the compounds of this invention are the 17-alkylthio substitution products of 5-androsten-3β-ol and derivatives thereof described in our copending application, Serial No. 485,606, filed February 1, 1955, now U. S. Patent 2,753,361. These thioethers can be represented by the structural formula

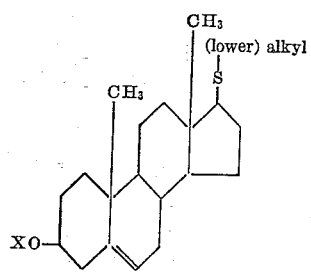

wherein the alkylthio group attached at position 17 is in either the alpha or beta configuration, and X is defined as hereinbefore.

In applying the oxidative procedures of our invention, we have found that the sulfur atom of these 17-alkylthio substitution products of 5-androsten-3β-ol is so rapidly oxidized by peroxy acids such as perbenzoic acid, that sulfoxides and sulfones can be prepared in good yield and in a high state of purity without the necessity of protecting the 3-hydroxy group or the 5,6-double bond from oxidative attack. For example, treatment of a solution of a 17-alkylthio-5-androsten-3β-ol with approximately one molecular equivalent of perbenzoic acid yields predominantly a mixture of stereoisomeric sulfoxides, both of which retain the configuration at carbon atom number 17 of the original thioether. Only small amounts of a sulfone and unreacted starting material are isolated when the oxidation reaction is run in this manner. If desired, the mixture of sulfoxides can be separated into its stereoisomeric components by methods described hereinafter.

When a solution of a 17-alkylthio-5-androsten-3β-ol is treated with approximately two molecular equivalents of perbenzoic acid, the principal product obtained is the sulfone, which retains the configuration at carbon atom number 17 of the original thioether. The sulfones of this invention can also be prepared by oxidation of the corresponding sulfoxide or stereoisomeric sulfoxide mixture with one molecular equivalent of a peroxy acid such as perbenzoic acid. Other peroxidic reagents, including performic acid, peracetic acid, and perphthalic acid, are suitable for use in preparing the sulfoxides and sulfones described herein.

Another useful transformation included within the scope of our invention is the isomerization of a 17α-sulfone derivative to the corresponding 17β-sulfone derivative. For example, 17α-methylsulfonyl-5-androsten-3β-ol can be isomerized with potassium tert.-butoxide to 17β-methylsulfonyl-5-androsten-3β-ol, and this type of procedure affords a valuable synthetic route to sulfones of the 17β series.

Treatment of a 17-alkylsulfonyl-5-androstein-3β-ol or a 17-alkylsulfinyl-5-androsten-3β-ol with an acylating agent such as an acid anhydride or an acid chloride yields the corresponding 3-acyloxy derivative. The same acyloxy derivative can be obtained by oxidizing a 3β-acyloxy-17-alkylthio-5-androstene to the sulfoxide or sulfone with perbenzoic acid.

The compounds of this invention have valuable hormonal and anti-hormonal properties. They are effective antagonists of naturally-occurring steroid hormones which can be regarded as their structural analogs, and exhibit selective anti-cortisone action. These compounds have anti-infective, and in particular anti-viral properties. As a specific example of their use, they can be administered with cortisone to inhibit the ability of cortisone to promote a Coxsackie virus infection. An additional utility of the compounds of this invention is as intermediates in chemical synthesis. For example, oxidation of the claimed compositions which have a 3-hydroxyl group with aluminum isopropoxide in toluene and cyclohexanone solution affords a new series of valuable pharmacological agents having anti-inflammatory properties, as evidenced by their effectiveness in reducing inflammation of the iris.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight.

*Example 1*

A stirred solution of 9.6 parts of 17α-methylthio-5-androsten-3β-ol in 880 parts of benzene is treated over a period of 30 minutes by the gradual addition of a 0.3 molar solution of perbenzoic acid in benzene containing a total of 8.28 parts of perbenzoic acid. After an additional hour the solution is washed with sodium bicarbonate solution and with water and then concentrated to dryness. The residue in benzene solution is reprecipitated by the addition of petroleum ether. This product is then crystallized several times from aqueous alcohol and finally from a mixture of benzene and petroleum ether to give purified 17α-methylsulfonyl-5-androsten-3β-ol melting at 225–227° C. It has the structural formula

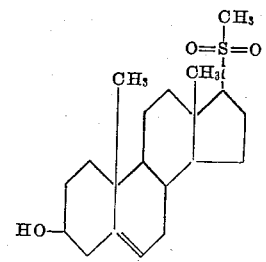

*Example 2*

A mixture of 2 parts of 17α-methylsulfonyl-5-androsten-3β-ol, 20 parts of pyridine and 15 parts of valeric anhydride is heated at 90–100° C. for 2 hours and is then allowed to stand at room temperature for an additional 18 hours. When the reaction mixture is poured into a large excess of water, a precipitate of the valeric acid ester of 17α-methylsulfonyl-5-androsten-3β-ol separates. This ester has the structural formula

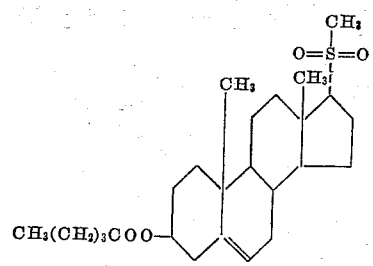

*Example 3*

A stirred solution of 3.5 parts of 17α-propylthio-5-androsten-3β-ol in 530 parts of benzene is treated by the gradual addition of a 0.3 molar solution of perbenzoic acid in benzene containing a total of 2.85 parts of perbenzoic acid. This operation is carried out over a period of about 20 minutes. After an additional hour at room temperature the reaction mixture is washed with sodium bicarbonate solution and with water. The residue obtained when the organic phase is concentrated to dryness is dissolved in benzene, and the crude product is reprecipitated by the addition of petroleum ether. Further purification by recrystallization from aqueous ethanol or from a mixture of benzene and petroleum ether yields 17α-propylsulfonyl-5-androsten-3β-ol. This compound has the structural formula

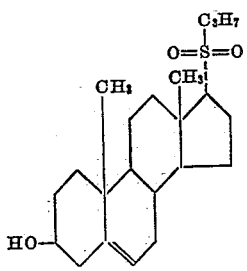

Example 4

Five parts of 17α-methylsulfonyl-5-androsten-3β-ol is dissolved in a solution prepared from 3.6 parts of potassium and 70 parts of tert.-butanol. This reaction mixture is heated under reflux for 17 hours and then concentrated by distillation to about two-thirds of its original volume. The remaining solution is poured into about 300 parts of ice water and this mixture is acidified by the addition of 15 parts of concentrated hydrochloric acid. The precipitated product is collected on a filter, washed with water, dried, and recrystallized from ethyl alcohol or from ethyl acetate. In this manner there is obtained the isomerized sulfone, 17β-methylsulfonyl-5-androsten-3β-ol melting at 242–244° C. This compound has the structural formula

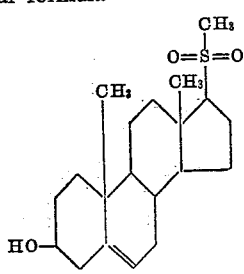

Example 5

A stirred solution of 1.80 parts of 17β-butylthio-5-androsten-3β-ol in 350 parts of benzene is treated over a period of 20 minutes by the gradual addition of a 0.3 molar solution of perbenzoic acid in benzene containing a total of 1.40 parts of perbenzoic acid. The reaction mixture is allowed to stand at room temperature for an additional hour, after which it is washed with sodium bicarbonate solution and with water and then concentrated to dryness. Partial purification of the residual product is achieved by redissolving it in benzene and precipitating it by the addition of petroleum ether. Recrystallization from a mixture of benzene and petroleum ether then gives purified 17β-butylsulfonyl-5-androsten-3β-ol having the structural formula

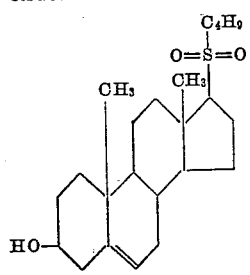

Example 6

A solution of 3.4 parts of 17β-methylsulfonyl-5-androsten-3β-ol, 15 parts of pyridine and 15 parts of acetic anhydride is allowed to stand at room temperature for 16 hours and is then poured, with efficient stirring, into 150 parts of ice water. The precipitated product is collected on a filter, dried, and recrystallized from ethyl acetate to give the acetate of 17β-methylsulfonyl-5-androsten-3β-ol melting at 227–229° C. This compound has the structural formula

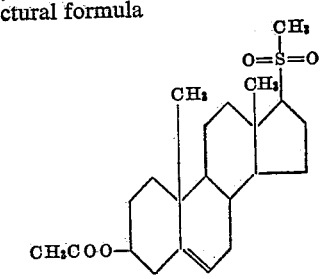

Example 7

A mixture of 3 parts of 17β-methylthio-5-androsten-3β-ol, 18 parts of pyridine and 12 parts of acetic anhydride is allowed to stand at room temperature for 18 hours and is then poured, with stirring, into 200 parts of ice water. The precipitated product, 3β-acetoxy-17β-methylthio-5-androsten, is collected on a filter, washed with water and dried. This product can be used in the following operation without further purification. It is dissolved in 440 parts of benzene, and the solution is treated over a period of 20 minutes by the gradual addition of a 0.3 molar solution of perbenzoic acid in benzene containing a total of 2.6 parts of perbenzoic acid. After an additional 20 minutes, the reaction mixture is washed rapidly with cold sodium bicarbonate solution and with several portions of ice water and is then concentrated to dryness. Purification of the residual product by recrystallization from ethyl acetate affords the acetate of 17β-methylsulfonyl-5-androsten-3β-ol, identical with the product of Example 6.

Example 8

A stirred solution of 6.4 parts of 17α-methylthio-5-androsten-3β-ol in 440 parts of benzene is treated over a period of 20 minutes by the gradual addition of a 0.45 molar solution of perbenzoic acid in benzene containing a total of 2.76 parts of perbenzoic acid. The reaction mixture is allowed to stand at room temperature for an additional hour and is then extracted with dilute sodium bicarbonate solution and with several portions of water. A solid product, insoluble in either the organic or aqueous phase, is present during the extraction procedure, and is collected on a filter. This product amounts to about 2 parts and is digested with 9 parts of hot benzene. The fraction which remains undissolved is combined with the fraction which crystallizes when the hot benzene solution is cooled, and the combined material is purified by recrystallization from aqueous methanol. In this manner there is obtained a 17α-methylsulfinyl-5-androsten-3β-ol having a melting point of 244–245° C. and a specific rotation of −75° in chloroform solution. A stereoisomeric sulfoxide is obtained from the benzene solution remaining after the original extraction of the reaction mixture. The crystalline residue obtained by evaporation of this benzene solution, when recrystallized successively from ethyl acetate and from benzene, yields a 17α-methylsulfinyl-5-androsten-3β-ol melting at 182–184° C. and having a specific rotation of −167° in chloroform solution. These two isomeric sulfoxides differ in the spacial orientation of the group bonded to the sulfur atom, and they have the structural formula

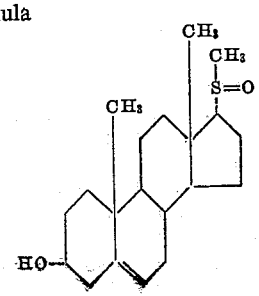

wherein the valence bonds directed between the sulfur atom and the oxygen atom, and between the sulfur atom and the methyl group, are without configurational significance.

Example 9

A stirred solution of 2.68 parts of 17β-methylthio-5-androsten-3β-ol in 88 parts of benzene is treated over a period of 20 minutes by the gradual addition of a 0.13 molar solution of perbenzoic acid in benzene containing a total of 1.15 parts of perbenzoic acid. The reaction mixture is then poured on a chromatography column prepared from 155 parts of silica. The column is eluted successively with 450 parts of a 5 volume percent solution of ethyl acetate in benzene, with 900 parts of a 10 volume percent solution of ethyl acetate in benzene, and with 900 parts of a 50 volume percent solution of ethyl acetate in benzene. Benzoic acid is removed from the column with these solvent mixtures. Elution with 1800 parts of ethyl acetate then yields a small amount of 17β-methylsulfonyl-5-androsten-3β-ol. The column is next eluted with 1800 parts of a 5 volume percent solution of acetone in ethyl acetate and with 9000 parts of a 10 volume percent solution of acetone in ethyl acetate. The crystalline fractions obtained by elution with the first portions of the 10 volume percent solution of acetone in ethyl acetate yield, after recrystallization from acetone and from aqueous methanol, a purified 17β-methylsulfinyl-5-androsten-3β-ol which melts with decomposition at about 271–273° C. This isomer has a specific rotation of about +7° in chloroform solution. Fractions from the chromatography column with later portions of the 10 volume percent solution of acetone in ethyl acetate give crystalline residues which consist principally of mixtures of the stereoisomeric sulfoxides. Eluates obtained with the final portions of the 10 volume percent solution of acetone in ethyl acetate, as well as later eluates obtained with a 50 volume percent solution of acetone in ethyl acetate and with acetone contain chiefly the other stereoisomeric sulfoxide. The crystalline residue obtained by concentration of these eluates is recrystallized successively from acetone, from aqueous methanol, from ethyl acetate, and from aqueous methanol to yield the stereoisomeric 17β-methylsulfinyl-5-androsten-3β-ol. This compound is obtained as a hemihydrate. It melts with decomposition at about 283–288° C. and has a specific rotation of about −115° in chloroform solution. These stereoisomeric sulfoxides have the structural formula

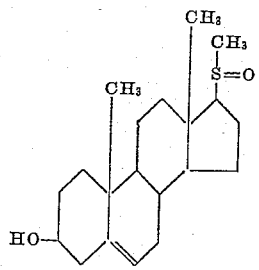

wherein the valence bonds directed between the sulfur atom and the oxygen atom, and between the sulfur atom and the methyl group, are without configurational significance.

Example 10

A stirred solution of 7.2 parts of 17β-butylthio-5-androsten-3β-ol in 880 parts of benzene is treated over a period of 20 minutes by the gradual addition of a 0.45 molar solution of perbenzoic acid in benzene containing a total of 2.74 parts of perbenzoic acid. The reaction mixture is allowed to stand at room temperature for an additional hour and is then extracted with dilute sodium bicarbonate solution and with several portions of water. Sufficient additional benzene is added to redissolve any organic product which precipitates during these operations. Separation and concentration of the organic phase affords a residue which consists substantially of a mixture of the two stereoisomeric 17β-butylsulfinyl-5-androsten-3β-ols. Various further operations can be performed on this product by employing types of procedures described in previous examples. For example, further oxidation with 1 molecular equivalent of perbenzoic acid yields a stereochemically-pure sulfone. Chromatographic fractionation of the sulfoxide mixture on a silica gel column affords the individual isomeric sulfoxides. The sulfoxides, either individually or as the stereoisomeric mixture, can be converted to esters by appropriate treatment with an acylating agent. For example, 5 parts of the mixture of stereoisomeric 17β-butylsulfinyl-5-androsten-3β-ols is dissolved in a mixture of 30 parts of pyridine and 10 parts of propionic anhydride, and the reaction mixture is allowed to stand at room temperature for about 20 hours. Cautious dilution of the reaction mixture with a small amount of water to hydrolyze the excess propionic anhydride, followed by dilution with a large excess of water to precipitate the organic product, yields the propionic acid esters of the 17β-butylsulfinyl-5-androsten-3β-ols. These esters have the structural formula

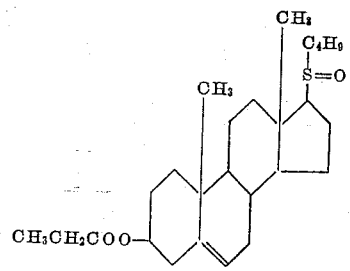

wherein the valence bonds directed between the sulfur atom and the oxygen atom, and between the sulfur atom and the methyl group, are without configurational significance.

Example 11

A mixture of the stereoisomeric 17β-methylsulfinyl-5-androsten-3β-ols (1.45 parts) is dissolved in a solution of 7 parts of pyridine and 7 parts of acetic anhydride. This reaction mixture is heated at 90–100° C. for 30 minutes and then allowed to stand at room temperature for 2 hours. It is poured into ice water, and the precipitated product is collected on a filter, washed with water and dried. A solution of this crude product in benzene is poured on a silica gel chromatography column and the column is eluated with mixtures of benzene and ethyl acetate containing gradually increasing proportions of ethyl acetate. In this manner there are successively obtained the individual stereoisomeric acetates of 17β-methylsulfinyl-5-androsten-3β-ols. These acetates melt, respectively, at about 188–190° C. and at about 219–220° C. and have the structural formula

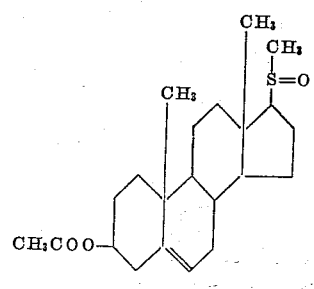

wherein the valence bonds directed between the sulfur atom and the oxygen atom, and between the sulfur atom and the methyl group, are without configurational significance.

What is claimed is:
1. A compound having the structural formula

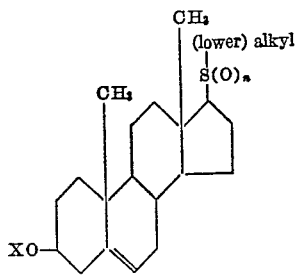

wherein X is a member of the group consisting of hydrogen and acyl radicals derived from lower alkanoic acids and n is a positive integer less than 3.

2. A compound having the structural formula

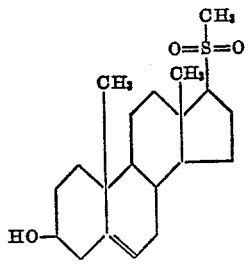

3. 17β-methylsulfonyl-5-androsten-3β-ol.
4. 17α-methylsulfonyl-5-androsten-3β-ol.
5. A compound having the structural formula

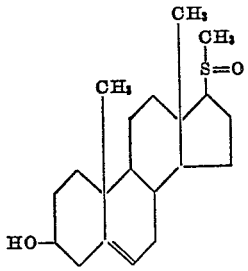

6. 17β-methylsulfinyl-5-androsten-3β-ol.
7. 17α-methylsulfinyl-5-androsten-3β-ol.

8. A process which comprises mixing a solution of a compound having the structural formula

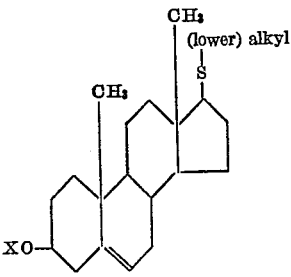

wherein X is a member of the group consisting of hydrogen and acyl radicals derived from lower alkanoic acids, with an organic peroxy acid, and isolating from the reaction mixture a product having the structural formula

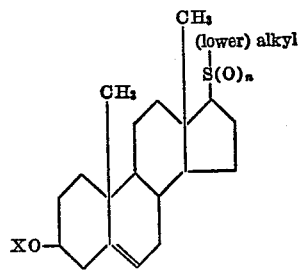

wherein X is defined as before and n is a positive integer less than 3.

9. A process which comprises mixing a solution of a 17-alkylthio-5-androsten-3β-ol with substantially 2 molecular equivalents of an organic peroxy acid and isolating from the reaction mixture a 17-alkylsulfonyl-5-androsten-3β-ol.

10. A process which comprises mixing a solution of a 17-methylthio-5-androsten-3β-ol with substantially 2 molecular equivalents of perbenzoic acid and isolating from the reaction mixture a 17-methylsulfonyl-5-androsten-3β-ol.

11. A process which comprises mixing a solution of a 17-alkylthio-5-androsten-3β-ol with substantially 1 molecular equivalent of an organic peroxy acid and isolating from the reaction mixture a 17-alkylsulfinyl-5-androsten-3β-ol.

12. A process which comprises mixing a solution of a 17-methylthio-5-androsten-3β-ol with substantially 1 molecular equivalent of perbenzoic acid and isolating from the reaction mixture a 17-methyl-sulfinyl-5-androsten-3β-ol.

No references cited.